US 11,365,961 B2

(12) United States Patent
Choi et al.

(10) Patent No.: US 11,365,961 B2
(45) Date of Patent: Jun. 21, 2022

(54) POLARIZATION HOLOGRAPHIC MICROSCOPE SYSTEM AND SAMPLE IMAGE ACQUISITION METHOD USING THE SAME

(71) Applicant: KOREA UNIVERSITY RESEARCH AND BUSINESS FOUNDATION, Seoul (KR)

(72) Inventors: Youngwoon Choi, Seoul (KR); Taeseok Yang, Seoul (KR); Kwanjun Park, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 6 days.

(21) Appl. No.: 16/928,442

(22) Filed: Jul. 14, 2020

(65) Prior Publication Data
US 2021/0199417 A1   Jul. 1, 2021

(30) Foreign Application Priority Data
Dec. 27, 2019   (KR) ........................ 10-2019-0176926

(51) Int. Cl.
| | | |
|---|---|---|
| *G01B 9/02001* | (2022.01) | |
| *G02B 21/00* | (2006.01) | |
| *G03H 1/00* | (2006.01) | |
| *G01B 9/021* | (2006.01) | |
| *G06T 5/00* | (2006.01) | |

(Continued)

(52) U.S. Cl.
CPC .......... *G01B 9/02011* (2013.01); *G01B 9/021* (2013.01); *G01B 9/02041* (2013.01); *G01B 9/04* (2013.01); *G02B 21/0032* (2013.01); *G02B 21/0048* (2013.01); *G02B 21/0056* (2013.01); *G03H 1/0005* (2013.01); *G06T 3/40* (2013.01); *G06T 5/002* (2013.01);
(Continued)

(58) Field of Classification Search
CPC  G02B 21/0048; G02B 21/0056; G01B 9/021; G01B 9/04; G01B 2290/70; G03H 1/0005; G03H 2001/005
See application file for complete search history.

(56) References Cited

U.S. PATENT DOCUMENTS

| | | | |
|---|---|---|---|
| 8,248,614 B2* | 8/2012 | Mann ................. | G01B 9/02024 356/485 |
| 8,896,840 B2* | 11/2014 | Matsubara .......... | G01N 21/453 356/458 |

(Continued)

FOREIGN PATENT DOCUMENTS

| | | |
|---|---|---|
| KR | 10-2005-0021682 A | 3/2005 |
| KR | 10-1789441 B1 | 10/2017 |
| KR | 10-2019-0117310 A | 10/2019 |

OTHER PUBLICATIONS

English translation of KR 10-1789441. Obtained from ESPACENET on Sep. 14, 2021. (Year: 2021).*

(Continued)

*Primary Examiner* — Michael A Lyons
(74) *Attorney, Agent, or Firm* — Sughrue Mion, PLLC

(57) ABSTRACT

A polarization holographic microscope system is disclosed. The polarization holographic microscope system can acquire a birefringence image and a three-dimensional phase image with high sensitivity by aperture synthesis of sample beams at various angles, and a sample image acquisition method using the microscope system.

13 Claims, 9 Drawing Sheets

(51) Int. Cl.
  *G06T 3/40* (2006.01)
  *G01B 9/02* (2022.01)
  *G01B 9/04* (2006.01)

(52) U.S. Cl.
  CPC ... *G01B 2290/70* (2013.01); *G03H 2001/005* (2013.01); *G06T 2207/10056* (2013.01)

(56) References Cited

U.S. PATENT DOCUMENTS

2020/0081236 A1\* 3/2020 Park .................. G02B 21/0048
2020/0182788 A1\* 6/2020 Shaked ................ G03H 1/0005
2020/0245905 A1\* 8/2020 Chen ...................... A61B 1/063

OTHER PUBLICATIONS

Communication dated Feb. 17, 2021 by the Korean Intellectual Property Office in application No. 10-2019-0176926.
Kwanjun Park et al. "Enhancement of Measurement Sensitivity of Polarization Holographic Microscopy", Optical Society of Korea, Jul. 2019, pp. 78.

\* cited by examiner

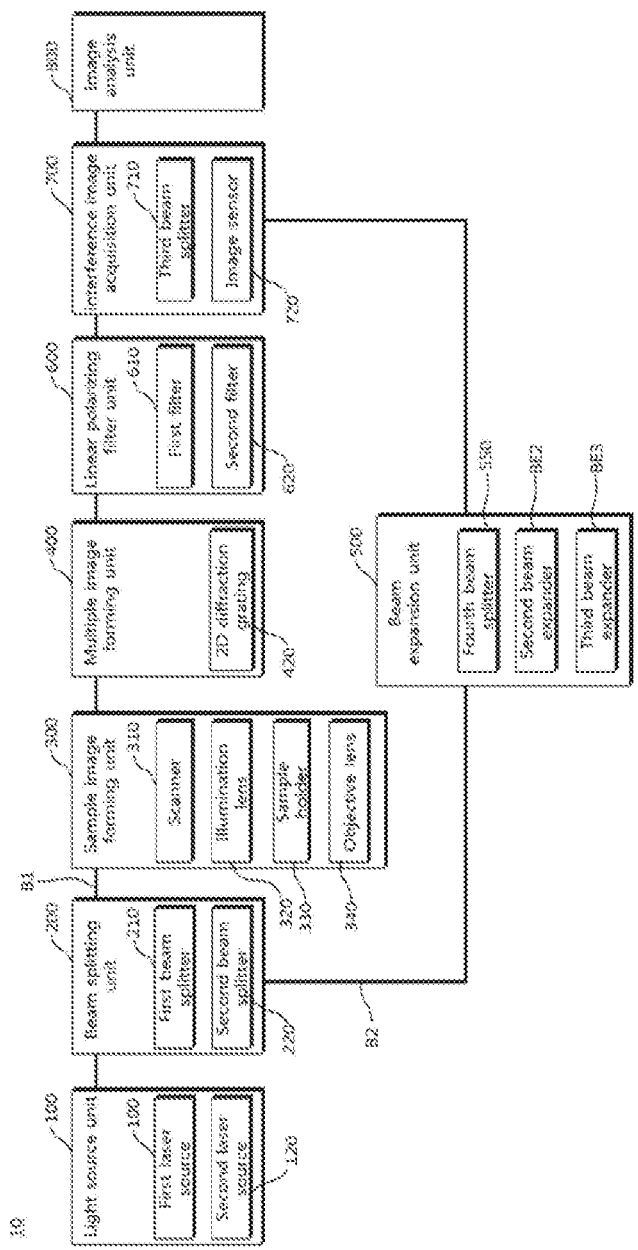

POLARIZATION HOLOGRAPHIC MICROSCOPE SYSTEM AND SAMPLE IMAGE ACQUISITION METHOD USING THE SAME

BACKGROUND OF THE INVENTION

1. Field of the Invention

The present invention relates to a polarization holographic microscope system and a sample image acquisition method using the same. More specifically, the present to invention relates to a polarization holographic microscope system that can acquire a birefringence image and a three-dimensional phase image with high sensitivity by aperture synthesis of sample beams at various angles, and a sample image acquisition method using the microscope system.

2. Description of the Related Art

Polarization holographic microscopes are optical measurement instruments based on digital holographic technology. This technology enables simultaneous measurement of phase information as well as intensity information of light from target objects based on the interference of light.

Morphological information such as thickness, volume, dry mass, and refractive index distribution can be quantitatively acquired in numbers from phase information delayed by objects.

A Mach-Zehnder interferometer is mainly used to acquire phase information of an image using digital holographic technology. In the Mach-Zehnder interferometer, light from a light source is divided into two beams by a beam splitter. One of the beams is incident on a target object (sample beam) and the other beam passes through a space where no object is present (reference beam). The beams interfere with each other when combined. This interference pattern is detected by an image sensor.

An off-axis method is typically used to create an interference pattern. According to this method, when a sample beam and a reference beam meet and interfere with each other in a camera detector, one of both beams is at an angle off the optical axis such that an interference pattern in the form of straight stripes is created in an acquired image. When an object lies in the acquired image, the straight stripe pattern is deformed. This deformation is analyzed to extract phase information.

An object containing specific materials optically inducing birefringence retards the phase of light and rotates the polarization state of light. This phenomenon is attributed to the aligned structure of molecularly anisotropic materials present in the object.

A polarization microscope is an optical measurement device for selectively imaging birefringent materials. In the device, two polarizing filters diagonal to each other are arranged in an illumination unit and an imaging unit having information about an object, respectively. With this arrangement, only information whose polarization state is rotated by birefringent materials passes through the polarizing filter of the imaging unit and is finally detected by a camera detector.

However, conventional polarization microscopes based on the measurement of light intensity have a limitation in that polarization states containing information about intensity and phase of light and expressed as complex numbers cannot be perfectly measured.

SUMMARY OF THE INVENTION

The present invention has been made in an effort to solve the problems of the prior art, and one aspect of the present invention is to provide a polarization holographic microscope system that can acquire a birefringence image and a three-dimensional phase image with high sensitivity by aperture synthesis of sample beams at various angles, and a sample image acquisition method using the microscope system.

Aspects of the present invention are not limited to the above-mentioned aspect and those skilled in the art will clearly understand other unmentioned aspects from the following description.

A polarization holographic microscope system according to one embodiment of the present invention includes: a light source unit irradiating laser beams having different polarization directions; a beam splitting unit splitting the laser beams from the light source unit into a sample beam and a reference beam; a sample image forming unit controlling the angle of the sample beam from the beam splitting unit and allowing the sample beam to enter a sample to form images of the sample at different angles in the sample beam; a multiple image forming unit diffracting the sample beam having passed through the sample image forming unit to form multiple images in each of the images at different angles; a linear polarizing filter unit polarizing the sample beam having passed through the multiple image forming unit; and an interference image acquisition unit combining the sample beam having passed through the linear polarizing filter unit with the reference beam to acquire interference images at different angles, wherein each of the interference images at different angles may include multiple interference images having different polarization states.

In one embodiment, the polarization holographic microscope system may further include an image analysis unit acquiring a birefringence image and a three-dimensional cross-sectional image of the sample using the interference images at different angles acquired in the interference image acquisition unit wherein the image analysis unit may calculate the interference images at different angles using the Jones matrix method to acquire matrix images of the sample at different angles, the matrix images at different angles may include multiple amplitude matrix images at different angles and multiple phase matrix images at different angles, each of the amplitude matrix images at different angles may include multiple amplitude images, and each of the phase matrix images at different angles may include multiple phase images.

In one embodiment, the image analysis unit may acquire a synthesized amplitude matrix image and a synthesized phase matrix image by aperture synthesis of the matrix images at different angles and a birefringence image of the sample by matrix diagonalization of the synthesized amplitude matrix image and the synthesized phase matrix image, the synthesized amplitude matrix image may include multiple synthesized amplitude images, and the synthesized phase matrix image may include multiple synthesized phase images.

In one embodiment, the image analysis unit may extract amplitude images at different angles as diagonal matrix elements from each of the amplitude matrix images at different angles to acquire a group of the amplitude images at different angles, extract phase images at different angles as diagonal matrix elements from each of the phase matrix images at different angles to acquire a group of the phase images at different angles, and acquire a three-dimensional cross-sectional image using the group of the amplitude images at different angles and the group of the phase images at different angles.

In one embodiment, the sample image forming unit may include a sample to holder holding the sample and a galvano scanner controlling the angle of the sample beam entering the sample from the beam splitting unit.

In one embodiment, the linear polarizing filter unit may include a first polarizing filter having a polarization axis of +45° and a second polarizing filter located in the Y-axis direction from the first polarizing filter and having a polarization axis of −45°, portions of the sample beam having passed through the multiple image forming unit may be polarized by the first polarizing filter, and portions of the sample beam having passed through the multiple image forming unit may be polarized by the second polarizing filter.

In one embodiment, the light source unit may include a first laser source irradiating a first laser beam and a second laser source irradiating a second laser beam having a polarization direction orthogonal to the polarization direction of the first laser beam, the beam splitting unit may include a first beam splitter splitting the first laser beam into the sample beam and the reference beam and a second beam splitter splitting the first laser beam into the sample beam and the reference beam, and the sample beam from the first beam splitter may overlap the sample beam from the second beam splitter.

In one embodiment, the multiple image forming unit may include a two-dimensional diffraction grating diffracting the sample beam having passed through the sample image forming unit and reproducing a single image contained in each of the images at different angles to form the multiple images in each of the images at different angles.

In one embodiment, the multiple image forming unit may further include a pair of lenses spaced apart from each other and the two-dimensional diffraction grating may be placed on the Fourier plane, where the sample beam is focused, between the pair of lenses.

In one embodiment, the image analysis unit may perform aperture synthesis of the matrix images at different angles to reduce diffraction noise and achieve improved resolution.

In one embodiment, the image analysis unit may simultaneously acquire information about the birefringence image and the three-dimensional cross-sectional to image.

A sample image acquisition method using the polarization holographic microscope system according to one embodiment of the present invention includes: allowing the light source unit to irradiate laser beams having different polarization directions; allowing the beam splitting unit to split the laser beams into a sample beam and a reference beam; controlling the angle of the sample beam such that the sample beam enters a target sample to form images of the sample at different angles therein; diffracting the sample beam to form multiple images in each of the images at different angles; polarizing the sample beam, where the multiple images are formed, in each of the images at different angles; and combining the polarized sample beam with the reference beam to acquire interference images at different angles, wherein each of the interference images at different angles may include multiple interference images having different polarization states.

In one embodiment, the polarization holographic microscope system may further include an image analysis unit analyzing the interference images at different angles acquired in the interference image acquisition unit, the method may further include allowing the image analysis unit to calculate the interference images at different angles using the Jones matrix method to acquire matrix images of the sample at different angles, the matrix images at different angles may include multiple amplitude matrix images at different angles and multiple phase matrix images at different angles, each of the amplitude matrix images at different angles may include multiple amplitude images, and each of the phase matrix images at different angles may include multiple phase images.

In one embodiment, the method may further include acquiring a synthesized amplitude matrix image and a synthesized phase matrix image by aperture synthesis of the matrix images at different angles and acquiring a birefringence image of the sample by matrix diagonalization of the synthesized amplitude matrix image and the synthesized phase matrix image wherein the synthesized amplitude matrix image may include multiple synthesized amplitude images and the synthesized phase matrix image may include multiple synthesized phase images.

In one embodiment, the method may further include extracting amplitude images at different angles as diagonal matrix elements from each of the amplitude matrix images at different angles to acquire a group of the amplitude images at different angles, extracting phase images at different angles as diagonal matrix elements from each of the phase matrix images at different angles to acquire a group of the phase images at different angles, and acquiring a three-dimensional cross-sectional image using the group of the amplitude images at different angles and the group of the phase images at different angles.

The features and advantages of the present invention will become apparent from the following description with reference to the accompanying drawings. Prior to the detailed description of the invention, it should be understood that the terms and words used in the specification and the claims are not to be construed as having common and dictionary meanings but are construed as having meanings and concepts corresponding to the technical spirit of the present invention in view of the principle that the inventor can define properly the concept of the terms and words in order to describe his/her invention with the best method.

In the polarization holographic microscope system, polarized images at various angles can be acquired by varying the angle of the sample beam entering the sample.

In the polarization holographic microscope system, polarized images at various angles can be synthesized to reduce noise signals caused by diffraction, resulting in high signal-to-noise ratio. Therefore, the polarization holographic microscope system enables the acquisition of images with high sensitivity.

The polarization holographic microscope system can use two-dimensional phase images acquired at various angles to acquire a three-dimensional cross-sectional image, which can be used to acquire information about the volume of the sample.

Effects of the present invention are not limited to the above-mentioned effects and those skilled in the art will clearly understand other unmentioned effects from the appended claims.

BRIEF DESCRIPTION OF THE DRAWINGS

FIG. 2 is a block diagram showing the polarization holographic microscope system of FIG. 1.

FIG. 3 schematically shows the formation of images at different angles in a sample beam in a sample image forming unit of the polarization holographic microscope system illustrated in FIG. 1.

DETAILED DESCRIPTION OF THE INVENTION

Figure 1:
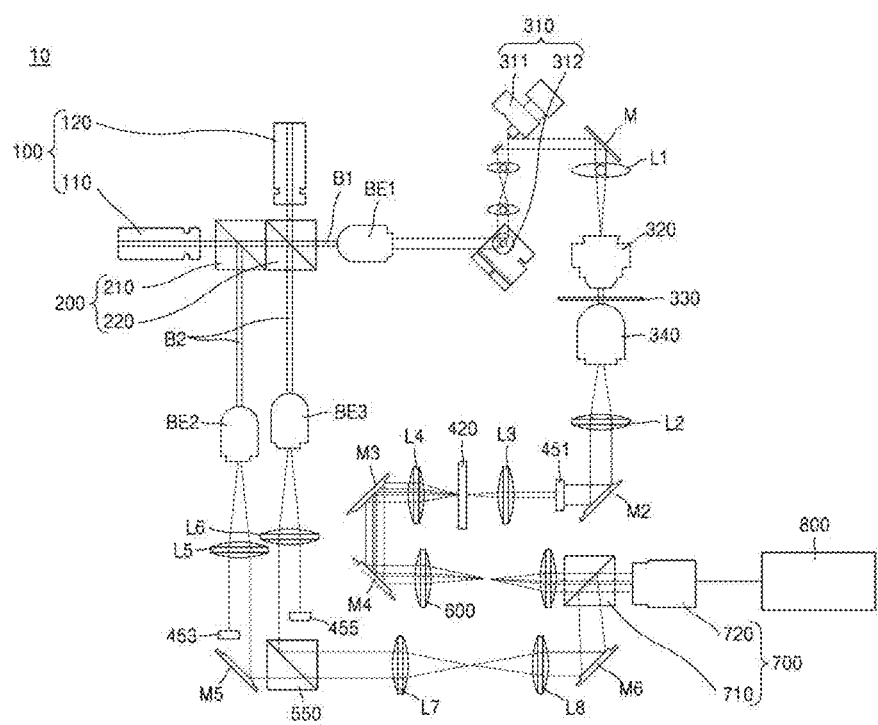
FIG. 1 is a schematic view illustrating a polarization holographic microscope system according to one embodiment of the present invention.

The advantages and features of the present invention and methods for achieving them will become more apparent from the following embodiments described in detail below in conjunction with the accompanying drawings. However, the present invention is not limited to the illustrated embodiments and may be embodied in various different forms. Rather, the disclosed embodiments are provided so that the disclosure of the present invention will be thorough and complete, and will fully convey the scope of the invention to those skilled in the art to which the present invention pertains. The scope of the present invention is defined by the claims that follow. Like reference numerals indicate like elements throughout the specification.

The embodiments described herein will be described with sectional and/or plan views as ideal exemplary views of the present invention. In the drawings, the thicknesses of layers and regions are exaggerated for clarity of illustration. Thus, the regions illustrated in the figures are schematic in nature and their shapes are not intended to illustrate the precise shape of a region of a device and are not intended to limit the scope of the present invention. It will be understood that, although the terms first, second, third, etc. may be used herein to describe various elements, these elements should not be limited by these terms. These terms are only used to distinguish one element from another. The embodiments described herein also include complementary embodiments thereof.

The terms used in the present application are merely used to describe particular embodiments, and are not intended to limit the present invention. As used herein, the singular forms "a", "an" and "the" are intended to include the plural forms as well, unless the context clearly indicates otherwise. It will be further understood that the terms "comprises (includes)" and/or "comprising (including)" when used in this specification, specify the presence of stated elements, steps, operations, and/or components, but do not preclude the presence or addition of one or more other elements, steps, operations, components, and/or groups thereof.

It will be understood that when an element is referred to as being "connected" or "coupled" to another element, it can be directly connected or coupled to the other element or intervening elements may be present.

Unless otherwise defined, all terms (including technical and scientific terms) used herein have the same meaning as commonly understood by one of ordinary skill in the art to which the present invention belongs. It will be further understood that terms, such as those defined in commonly used dictionaries, will not be interpreted in an idealized or overly formal sense unless expressly so defined herein.

Figure 4:
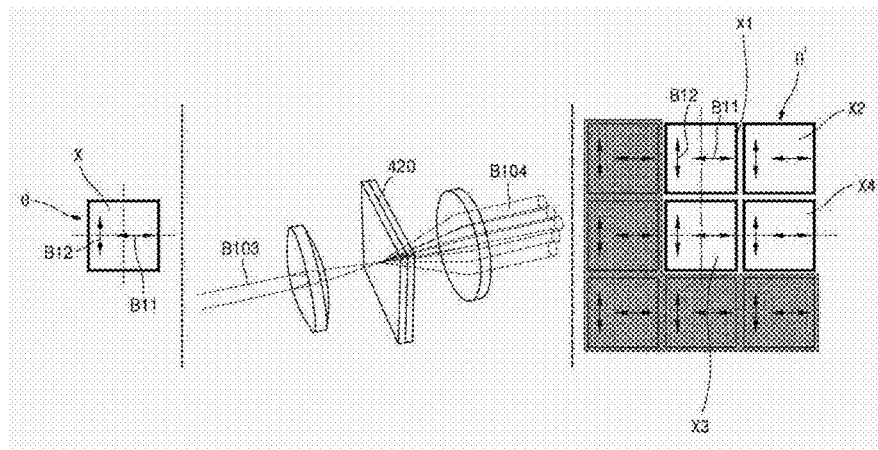
FIG. 4 schematically shows the formation of multiple images in a multiple image forming unit of the polarization holographic microscope system illustrated in FIG. 1.
Figure 5:
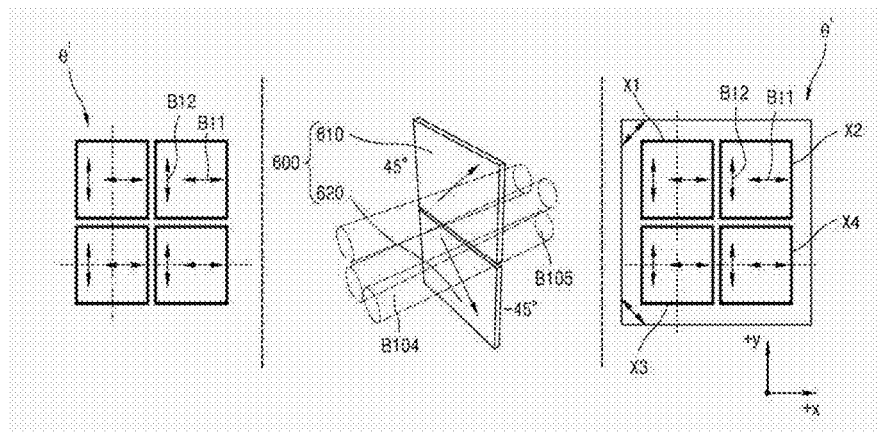
FIG. 5 shows the polarization of a sample beam in a polarizing filter unit of the polarization holographic microscope system illustrated in FIG. 1.
Figure 6:
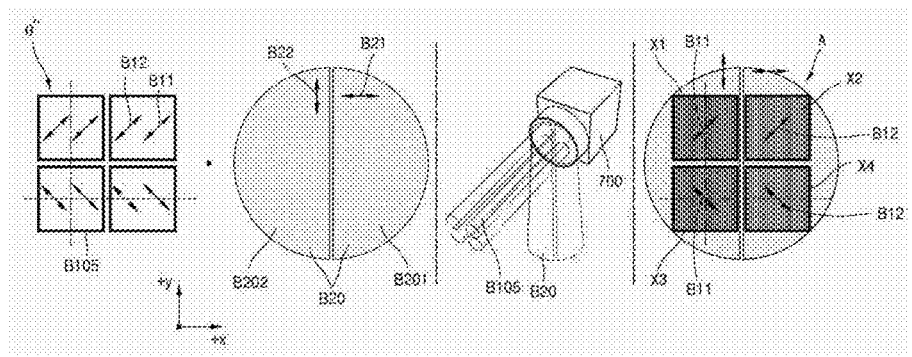
FIG. 6 schematically shows the formation of interference images at different angles in an interference image acquisition unit of the polarization holographic microscope system illustrated in FIG. 1.
Figure 7A:
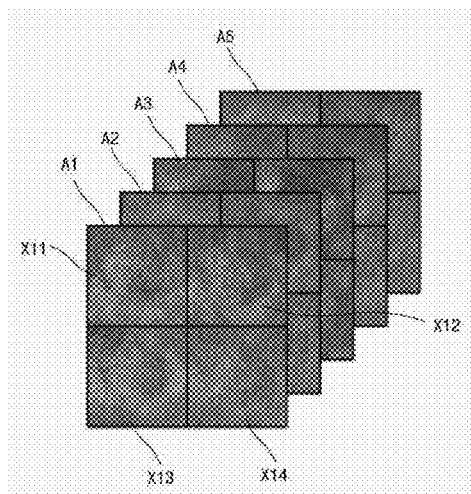
FIG. 7A shows interference images at different angles formed by an interference image acquisition unit of the polarization holographic microscope system illustrated in FIG. 1.
Figure 7B:
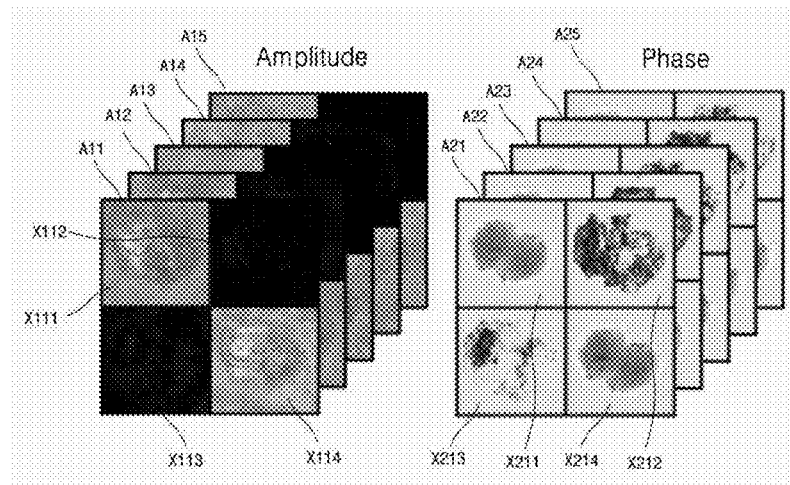
FIG. 7B shows matrix images at different angles acquired by calculating the interference images at different angles shown in FIG. 7A using the Jones matrix method.
Figure 8:
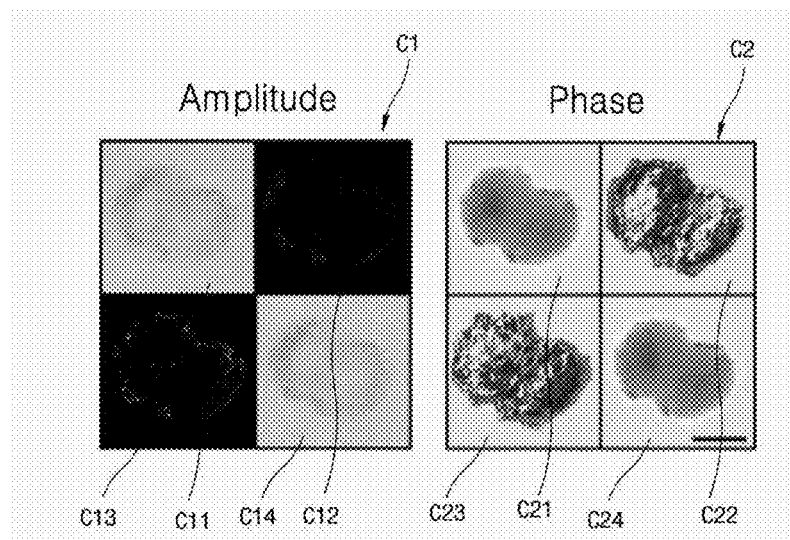
FIG. 8 shows synthesized matrix images acquired by aperture synthesis of the matrix images at different angles shown in FIG. 7B.
Figure 9:
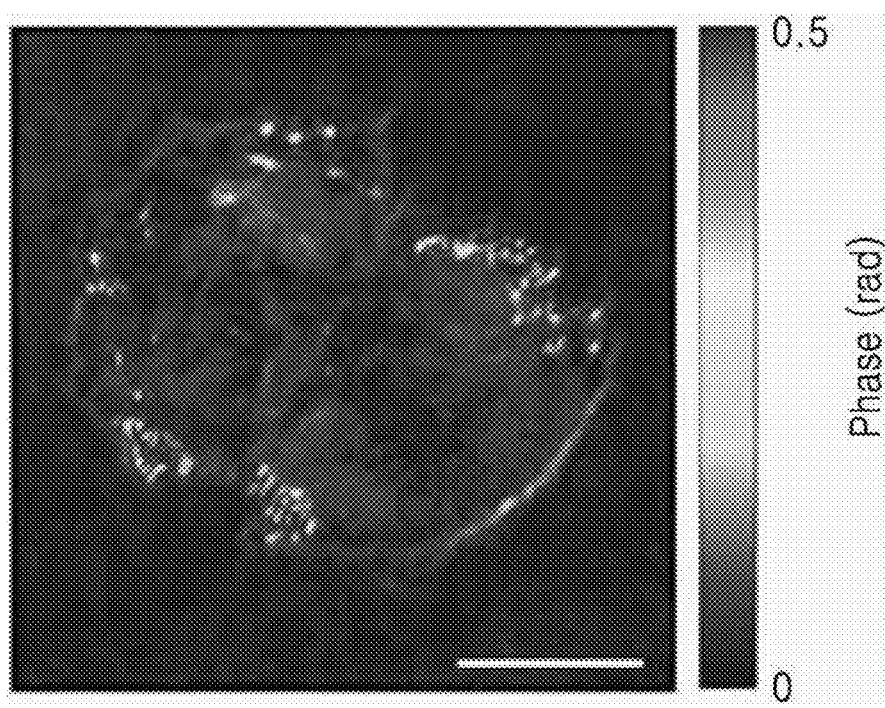
FIG. 9 shows a birefringence image acquired using the synthesized matrix images shown in FIG. 8.
Figure 10:
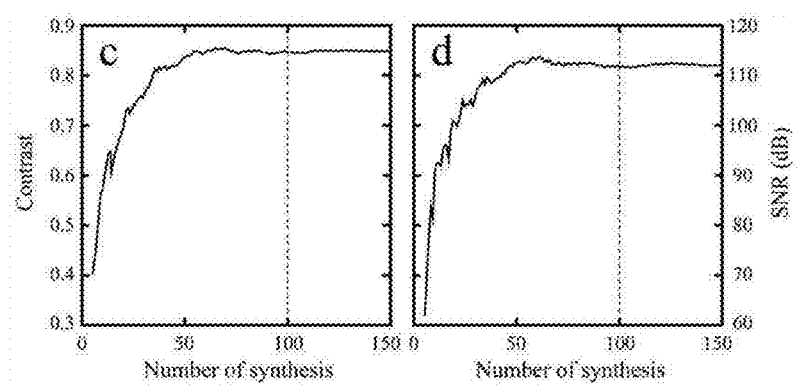
FIG. 10 shows the contrast and signal-to-noise ratio of the matrix images at different angles shown in FIG. 7B as a function of the number of aperture synthesis.
Figure 11:
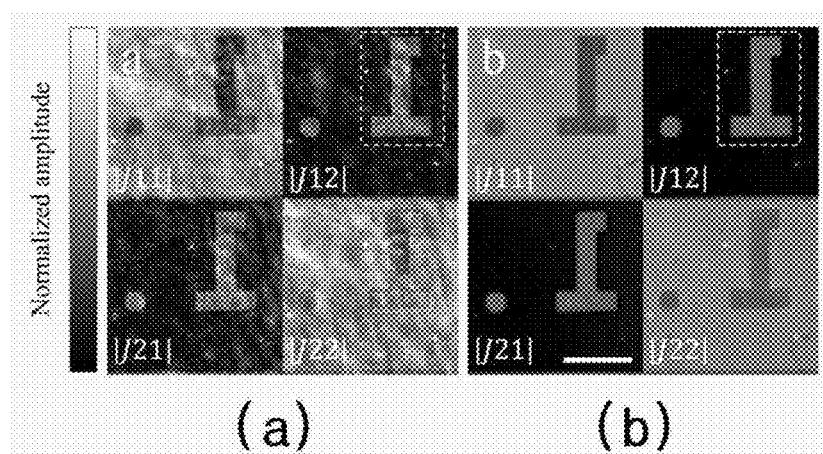
FIG. 11 shows a birefringence image acquired using single matrix images and a birefringence image acquired using matrix images at different angles.
Figure 12:
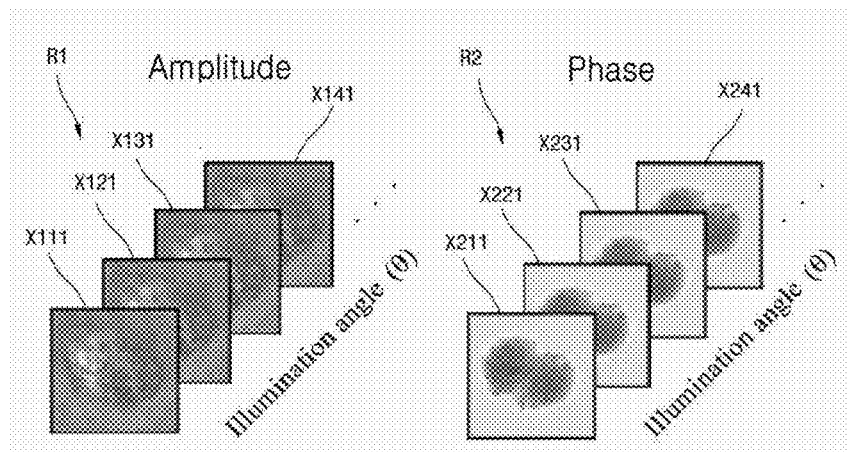
FIG. 12 shows a group of amplitude images at different angles and a group of phase images at different angles acquired from the matrix images at different angles shown in FIG. 7B.
Figure 13:
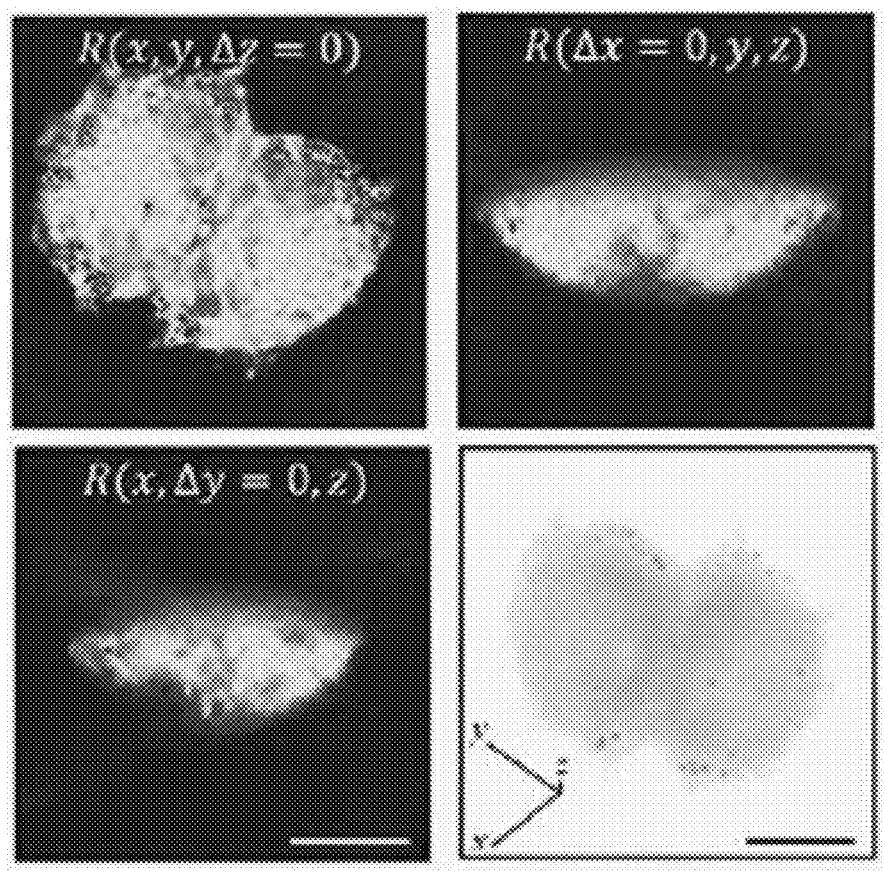
FIG. 13 shows two-dimensional phase images acquired using the group of amplitude images at different angles and the group of phase images at different angles shown in FIG. 12.

FIG. 1 is a schematic view illustrating a polarization holographic microscope system according to one embodiment of the present invention, FIG. 2 is a block diagram showing the polarization holographic microscope system of FIG. 1, FIG. 3 schematically shows the formation of images at different angles in a sample beam in a sample image forming unit of the polarization holographic microscope system illustrated in FIG. 1, FIG. 4 schematically shows the formation of multiple images in a multiple image forming unit of the polarization holographic microscope system illustrated in FIG. 1, FIG. 5 shows the polarization of a sample beam in a polarizing filter unit of the polarization holographic microscope system illustrated in FIG. 1, FIG. 6 schematically shows the formation of interference images at different angles in an interference image acquisition unit of the polarization holographic microscope system illustrated in FIG. 1, FIG. 7B shows interference images at different angles formed by an interference image acquisition unit of the polarization holographic microscope system illustrated in FIG. 1, FIG. 7B shows matrix images at different angles acquired by calculating the interference images at different angles shown in FIG. 7A using the Jones matrix method, FIG. 8 shows synthesized matrix images acquired by aperture synthesis of the matrix images at different angles shown in FIG. 7B, FIG. 9 shows a birefringence image acquired using the synthesized matrix images shown in FIG. 8, FIG. 10 shows the contrast and signal-to-noise ratio of the matrix images at different angles shown in FIG. 7B as a function of the number of aperture synthesis, (a) and (b) of FIG. 11 show a birefringence image acquired using single matrix images and a birefringence image acquired using matrix images at different angles, FIG. 12 shows a group of amplitude images at different angles and a group of phase images at different angles acquired from the matrix images at different angles shown in FIG. 7B, and FIG. 13 shows two-dimensional phase images acquired using the group of amplitude images at different angles and the group of phase images at different angles shown in FIG. 12.

Referring to FIGS. 1 to 13, the polarization holographic microscope system 10 can acquire a high-sensitivity birefringence image of a sample and a three-dimensional cross-sectional image from which the volume of the sample can be measured.

In an embodiment, the polarization holographic microscope system 10 may include a light source unit 100, a beam splitting unit 200, a sample image forming unit 300, a multiple image forming unit 400, a linear polarizing filter unit 600, an interference image acquisition unit 700, and an image analysis unit 800. The polarization holographic microscope system 10 may further include a beam expansion unit 500, a first beam expander BF1, a first path block 451, and a second path block.

The light source unit 100 can irradiate laser beams having different polarization directions. In an embodiment, the light source unit 100 may include a first laser source 110 and a second laser source 120. The first laser source 110 can irradiate a first laser beam and the second laser source 120 can irradiate a second laser beam having a polarization direction orthogonal to the polarization direction of the first laser beam.

In an embodiment, the first laser source 110 may polarize the first laser beam in the X-axis direction (0°) and the second laser source 120 may polarize the second laser beam in the Y-axis direction (90°). In an alternative embodiment, the first laser source 110 may polarize the first laser beam in the Y-axis direction (90°) and the second laser source 120 may polarize the second laser beam in the X-axis direction (0°). The first laser source 110 can irradiate the first laser beam in the X-axis direction and the second laser source 120 can irradiate the first laser beam in the Y-axis direction.

Although the irradiation of laser beams having different polarization directions from the plurality of laser sources of the light source unit 100 has been described in the foregoing embodiments, the light source unit 100 may include one laser source irradiating a laser beam that is split into laser beams having different polarization directions by suitable optical elements such as a beam splitter and a polarizing filter.

The beam splitting unit 200 can split the laser beams from the light source unit 100 into a sample beam and a reference beam. In an embodiment, the beam splitting unit 200 may include a first beam splitter 210 and a second beam splitter 220. Here, the sample beam refers to a beam irradiated along a sample path where a target sample is placed and the reference beam refers to a beam irradiated along a reference path where the sample is not placed.

The first beam splitter 210 may be located adjacent to the first laser source 110. In an embodiment, the first beam splitter 210 may be located in the X-axis direction from the first laser source 110. The first beam splitter 210 can split the first laser beam into a sample beam and a reference beam. For convenience of description, the sample beam from the first beam splitter 210 is referred to a first sample beam B11 and the reference beam from the first beam splitter 210 is referred to a first reference beam B21.

In an embodiment, the first reference beam B21 may be reflected in the Y-axis direction by the first beam splitter 210. The first sample beam B11 can be transmitted through the first beam splitter 210 and propagate in the X-axis direction.

The second beam splitter 220 may be located adjacent to the second laser source 120. In an embodiment, the second beam splitter 220 may be located in the Y-axis direction from the second laser source 120. The second beam splitter 220 may be located in the X-axis direction from the first beam splitter 210. The second beam splitter 220 can split the second laser beam into a sample beam and a reference beam. For convenience of description, the sample beam from the second beam splitter 220 is referred to a second sample beam B12 and the reference beam from the second beam splitter 220 is referred to a second reference beam B22.

In an embodiment, the second reference beam B22 can be transmitted through the second beam splitter 220 and propagate in the Y-axis direction. The second reference beam B22 can be reflected in the X-axis direction by the second beam splitter 220. The first sample beam B11 can be transmitted through the first beam splitter 210 and overlap the second sample beam B12. An overlapped beam between the first sample beam B11 and the second sample beam B12 is referred to as an overlapped sample beam B1 for convenience of description.

Although the first sample beam B11 and the second sample beam B12 share physically the same path (hereinafter, referred to as the "sample path"), they do not optically interfere with each other due to their different polarization directions.

The first beam expander BF1 may be located between the beam splitting unit 200 and the sample image forming unit 300. The first beam expander BF1 may be located in the sample path. The first beam expander BF1 can expand the overlapped sample beam B1 from the beam splitting unit 200. Thus, the width of the overlapped sample beam B1 can be enlarged.

The sample image forming unit 300 can control the angle of the overlapped sample beam B101 from the beam splitting unit 200 and allows the overlapped sample beam B101 to enter a sample SP. Due to its ability to control the angle of the sample beam B101 to be incident on the sample SP, the sample image forming unit 300 can form images θ of the sample SP at different angles in the sample beam B101. In an embodiment, the overlapped sample beam B101 to be incident on the sample image forming unit 300 may be expanded by the first beam expander BF1. The sample image forming unit 300 may be located between the beam splitting unit 200 and the multiple image forming unit 400. The sample image forming unit 300 may also be located in the sample path.

The sample image forming unit 300 may include a galvano scanner 310, an illumination lens 320, and a sample holder 330. In an embodiment, the sample image forming unit 300 may further include a first reflector M1, a first lens L1, and a second lens L2.

The sample holder 330 can hold the target sample SP. The sample holder 330 may be located between the illumination lens 320 and an objective lens 340.

The galvano scanner 310 can control the angle of the overlapped sample beam B1 from the beam splitting unit 200 and to be incident on the sample SP. In an embodiment, the galvano scanner 310 may change the optical axis of the overlapped sample beam B1 to the X- or Y-axis direction in response to an applied voltage. That is, the galvano scanner 310 may be a biaxial galvano scanner including an X-axis scanner 311 and a Y-axis scanner 312. The galvano scanner 310 operates such that the angle of the overlapped sample beam B1 to be incident on the sample SP is changed.

In an embodiment, the overlapped sample beam B101 whose angle is controlled by the galvano scanner may be reflected toward the first lens by the first reflector M1. The overlapped sample beam B101 can be transmitted through the first lens L1 and concentrated on a focal point situated on the illumination lens 320.

The illumination lens 320 can collect the incident overlapped sample beam B101 and allow the collected overlapped sample beam B101 to be irradiated onto the sample. In an embodiment, the illumination lens 320 may be a condenser lens.

The overlapped sample beam B101 incident on the sample SP can pass through the sample SP and propagate toward the objective lens 340. Images θ of the sample SP at different angles can be formed in the overlapped sample beam B102 having passed through the sample SP. In an embodiment, the images θ at different angles may include images at first to fifth angles. Only three images, i.e. an image θ1 at a first angle, an image θ2 at a second angle, and an image θ3 at a third angle, are shown in FIG. 3 due to the limited page space. The images θ at different angles will be described based on only an image at one angle. Each of the images θ at different angles may include a single image X (see FIG. 4).

The objective lens 340 can enlarge the overlapped sample beam B102 having passed through the sample SP. The second lens L2 may be located in the sample path. The second lens L2 can make the overlapped sample beam B102 having passed through the objective lens 340 parallel to the propagation direction. In an embodiment, the overlapped sample beam B102 having passed through the second lens L2 may enter the multiple image forming unit 400 through a second reflector M2.

The first path block 451 may be located between the multiple image forming unit 400 and the sample image forming unit 300. In an embodiment, the first path block 451 may be located between the second lens L2 and a third lens L3. The first path block 451 can determine areas for the images at different angles formed in the overlapped sample beam B102. In an embodiment, the area for each of the images at different angles may be quadrangular in shape but is not limited to this shape.

The multiple image forming unit 400 can diffract the overlapped sample beam B102 having passed through the sample image forming unit 300. Thus, the multiple image forming unit 400 can form multiple images in each of the images at different angles. For example, the single image X present in each θ of the images at different angles may be reproduced to form multiple images X1-X4 in the image θ' when the overlapped sample beam B103 passes through the multiple image forming unit 400. Here, the formation of the multiple images X1-X4 in each of the images θ' at different angles means the formation or presence of the multiple images in the image at each of the angles.

The multiple image forming unit 400 may be located in the sample path. In an embodiment, the multiple image forming unit 400 may include a two-dimensional diffraction grating 420 and a fourth lens L4 in addition to the third lens L3.

The third lens L3 and the fourth lens L4 may constitute a 4-f system. The 4-f system is based on the Fourier transform to acquire images with low signal-to-noise ratio. The third lens L3 and the fourth lens L4 may be spaced apart from each other.

The two-dimensional diffraction grating 420 can diffract the overlapped sample beam B103 having passed through the sample image forming unit 300. Thus, the two-dimensional diffraction grating 420 can reproduce the single image X included in each θ of the images at different angles formed in the overlapped sample beam B103 into multiple images.

In an embodiment, the two-dimensional diffraction grating 420 may be in the form of a plate in the XY-plane. The two-dimensional diffraction grating 420 may be located between the third lens L3 and the fourth lens L4. The two-dimensional diffraction grating 420 may be placed on the Fourier plane, where the overlapped sample beam B103 is focused, between the third lens L3 and the fourth lens L4. Thus, to the overlapped sample beam B104 having passed through the two-dimensional diffraction grating 420 can be split into a plurality of beams in the X-axis and/or Y-axis direction by diffraction.

In an embodiment, each θ of the images at different angles formed in the overlapped sample beam B103 may be $0^{th}$ $1^{st}$, and $-1^{st}$ order diffracted. Thus, the single image X included in each θ of the images at different angles can be reproduced into 9 images, and as a result, each θ' of the images at different angles may have 9 multiple images.

In an embodiment, portions of the overlapped sample beam B104 diffracted by the two-dimensional diffraction grating 420 may be blocked by an image block (not illustrated) because only four multiple images are required for the calculation of the Jones matrix, which will be explained later. Thus, only four of the nine multiple images included in each θ' of the images at different angles can be formed in the overlapped sample beam B104.

Referring again to FIG. 4, the single image X included in each θ of the images at different angles formed in the overlapped sample beam B103 can be reproduced by the $-1^{st}$ and $1^{st}$ orders in the X-axis direction by the two-dimensional diffraction grating 420 and the single image X included in each θ of the images at different angles formed in the overlapped sample beam B103 can be reproduced by the $-1^{st}$ and $1^{st}$ orders in the Y-axis direction by the two-dimensional diffraction grating 420. Thus, the nine multiple images included in each θ' of the images at different angles can be formed in the overlapped sample beam B104. However, only four X1-X4 of the nine multiple images can be formed in the overlapped sample beam B104 by an image block (not illustrated).

The multiple images at different angles reproduced by the two-dimensional diffraction grating 420 exhibit signals with the same intensity and have the same phase but are not limited thereto.

In an alternative embodiment, each θ of the images at different angles formed in the overlapped sample beam B103 may be $0^{th}$ and $1^{st}$ order diffracted. Thus, the single image X included in each θ of the images at different angles can be reproduced into four multiple images. That is, each θ of the images at different angles may have four multiple images, avoiding the need for an image block.

The overlapped sample beam B104 having passed through the multiple image forming unit 400 can enter the linear polarizing filter unit 600. In an embodiment, the overlapped sample beam B104 having passed through the multiple image forming unit 400 may be reflected by a reflector M3 and a reflector M4 and enter the linear polarizing filter unit 600.

The linear polarizing filter unit 600 can polarize the overlapped sample beam B104 having passed through the multiple image forming unit 400. The linear polarizing filter unit 600 may include a first polarizing filter 610 and a second polarizing filter 620. The first polarizing filter 610 and the second polarizing filter 620 may have different polarization axes.

In an embodiment, the first polarizing filter 610 may have a polarization axis of +45° but is not limited thereto. In an embodiment, the second polarizing filter 620 may be located in the Y-axis direction from the first polarizing filter 610. The second polarizing filter 620 may have a polarization axis of −45° but is not limited thereto. Portions of the overlapped sample beam B104 having passed through the multiple image forming unit 400 can pass through and polarized by the first polarizing filter 610.

Portions of the overlapped sample beam B104 having passed through the multiple image forming unit 400 can pass through and polarized by the second polarizing filter 620.

Referring to FIG. 5, the two multiple images X1 and X2 in the +Y axis can pass through the first polarizing filter 610 and the two multiple images X3 and X4 in the −Y axis can pass through the second polarizing filter 620. Thus, each θ" of the interference images at different angles may include the multiple interference images X1-X4 having different polarization states in the interference image acquisition unit 700 and the polarization holographic microscope system 10 can measure the polarization properties of the sample.

The overlapped sample beam B105 having passed through the linear polarizing filter unit 600 can enter the interference image acquisition unit 700. In an embodiment, to the overlapped sample beam B105 having passed through the linear polarizing filter unit 600 may pass through a fifth lens L5 and enter the interference image acquisition unit 700.

The first reference beam B21 and the second reference beam B22 from the beam splitting unit 200 can enter the beam expansion unit 500. The beam expansion unit 500 can enlarge the first reference beam B21 and the second reference beam B22. The beam expansion unit 500 may include a second beam expander BF2, a third beam expander BF3, a third path block 453, a fourth path block 455, and a fourth beam splitter 550. In an embodiment, the beam expansion unit 500 may further include a sixth lens L6, a seventh lens L7, and a fifth reflector M5.

The second beam expander BF2 can enlarge the first reference beam B21 from the first beam splitter 210. In an embodiment, the second beam expander BF2 may be located in the Y-axis direction from the first beam splitter 210.

The third beam expander BF3 can enlarge the second reference beam B22 from the second beam splitter 220. In an embodiment, the third beam expander BF3 may be located in the Y-axis direction from the second beam splitter 220.

The first reference beam B21 having passed through the second beam expander BF2 and the second reference beam B22 having passed through the third beam expander BF3 can enter the fourth beam splitter 550.

In an embodiment, the sixth lens L6, the third path block 453, and the fifth reflector M5 may be located between the fourth beam splitter 550 and the second beam expander BF2. The sixth lens can convert the first reference beam B21 to a parallel beam. The third path block 453 can determine the image area of the first reference beam B21. In an embodiment, the image area of the first reference beam B21 may have a semicircular shape in the +X axis but is not limited to this shape. The first reference beam B21 having passed through the third path block 453 can be reflected by the fifth reflector M5 and enter the fourth beam splitter 550.

In an embodiment, the seventh lens L7 and the fourth path block 455 may be located between the fourth beam splitter 550 and the third beam expander BF3. The seventh lens can convert the second reference beam B22 to a parallel beam. The fourth path block 455 can determine the image area of the second reference beam B22. In an embodiment, the image area of the second reference beam B22 may have a semicircular shape in the −X axis but is not limited to this shape. The second reference beam B22 having passed through the fourth path block 455 can enter the fourth beam splitter 550.

The first reference beam B21 can be transmitted through the fourth beam splitter 550 and the second reference beam B22 can be reflected by the fourth beam splitter 550. Thus, the first reference beam B21 and the second reference beam B22 can be irradiated toward the interference image acquisition unit 700. Although the first reference beam B21 and the second reference beam B22 share physically the same path (hereinafter, referred to as the "reference path"), they do not optically interfere with each other due to their different polarization directions and image areas. That is, the first reference beam B21 and the second reference beam B22 may overlap each other. An overlapped beam between the first reference beam B21 and the second reference beam B22 in the fourth beam splitter 550 is referred to as an overlapped reference beam B20 for convenience of description. In an embodiment, the overlapped reference beam B20 may include two semicircular images B201 and B202.

In an embodiment, the overlapped reference beam B20 may be transmitted through the seventh lens L7 and an eighth lens L8, reflected by a sixth reflector M6, and enter the interference image acquisition unit 700.

The interference image acquisition unit 700 allows the overlapped sample beam B105 having passed through the linear polarizing filter unit 600 to interfere with the overlapped reference beam B20 to acquire multiple interference images A at different angles. The interference image acquisition unit 700 may include a third beam splitter 710 and an image sensor 720.

The third beam splitter 710 can combine the overlapped sample beam B105 entering through one side thereof with the overlapped reference beam B20 entering through another side thereof. The overlapped sample beam B105 and the overlapped reference beam B20 can be transmitted parallel to each other by the third beam splitter 710. In other words, the configuration of the polarization holographic microscope system 10 can be constructed linearly.

The overlapped sample beam B105 and the overlapped reference beam B20 combined in the third beam splitter 710 can be transmitted to the image sensor 720 while interfering with each other. The image sensor 720 can acquire interference images A at different angles. In an embodiment, the image sensor 720 may be a CCD or CMOS but is not limited thereto.

Referring to FIG. 6, the four multiple images X1-X4 formed in the overlapped sample beam B105 may interfere with the two semicircular images B201 and B202 formed in the overlapped reference beam B20. Since the semicircular image B201 in the +X axis is formed by the first laser beam, the image B12 formed by the second laser beam does not interfere with the semicircular image in the +X axis and can thus be removed.

Since the semicircular image B202 in the −X axis is formed by the second laser beam, the image B11 formed by the first laser beam does not interfere with the semicircular image in the −X axis and can thus be removed. That is, the interference images X1-X4 at different angles acquired in the interference image acquisition unit 700 have different polarization states.

A detailed description is given with reference to FIGS. 5 and 6. Each θ" of the images at different angles may include the first multiple image X1, the second multiple image X2, the third multiple image X3, and the fourth multiple image X4 (see FIG. 5).

Each of the first multiple image X1 and the second multiple image X2 may have a polarization axis of +45° and may contain image information provided by the first sample beam B11 and image information provided by the second sample beam B12.

Each of the third multiple image X3 and the fourth multiple image X4 may have a polarization axis of −45° and may contain image information provided by the first sample beam B11 and image information provided by the second sample beam B12.

The semicircular image B201 in the +X axis may not interfere with the image information provided by the second sample beam B12 and contained in the second and fourth multiple images X2 and X4 but may interfere with the image information provided by the first sample beam B11.

The semicircular image B202 in the −X axis may not interfere with the image information provided by the first sample beam B11 and contained in the first and fourth multiple images X1 and X4 but may interfere with the image information provided by the second sample beam B12.

As a result of the above-described interference phenomenon, each A of the interference images at different angles may include multiple interference images. In an embodiment, each A of the interference images at different angles may include first to fourth interference images X1-X4.

As illustrated in FIG. 6, the first interference image X1 may correspond to the first multiple image, have a polarization axis of +45°, and contain interference image information corresponding to the image information provided by the second sample beam B12. The second interference image X2 may correspond to the second multiple image, have a polarization axis of +45°, and contain interference image information corresponding to the image information provided by the first sample beam B11. The third interference image X3 may correspond to the third multiple image, have a polarization axis of −45°, and contain interference image information corresponding to the image information provided by the second sample beam B12. The fourth interference image X4 may correspond to the fourth multiple image, have a polarization axis of −45°, and contain interference image information corresponding to the image information provided by the first sample beam B11. Thus, the first to fourth interference images X1-X4 may have different polarization states. That is, each A of the interference images at different angles may have multiple interference images having different polarization states.

The interference image acquisition unit 700 can transmit the acquired interference images A at different angles to the image analysis unit 800.

In the image analysis unit 800, the interference images A at different angles acquired in the interference image acquisition unit 700 can be used to acquire a birefringence image and a three-dimensional cross-sectional image of the sample. For example, the image analysis unit can simultaneously acquire information about a to birefringence image and a three-dimensional cross-sectional image and can use the acquired information to acquire a birefringence image and a three-dimensional cross-sectional image. In an embodiment, the image analysis unit 800 may be a microcontroller for computation but is not limited thereto.

The image analysis unit 800 can acquire matrix images of the sample at different angles by calculating the interference images A at different angles using the Jones matrix method. The matrix images A at different angles may include multiple amplitude matrix images at different angles and multiple phase matrix images at different angles. Each of the amplitude matrix images at different angles may include multiple amplitude images and each of the phase matrix images at different angles may include multiple phase images.

With reference to FIGS. 7A and 7B, the image analysis unit 800 can receive the multiple interference images A at different angles from the interference image acquisition unit 700. In an embodiment, the image analysis unit 800 may receive the interference images A1-A5 at first to fifth angles.

Each of the interference images A1-A5 at first to fifth angles may include four interference images having different polarization states. The interference image A1 at the first angle may include a 1-1$^{st}$ interference image X11, a 1-2$^{nd}$ interference image X12, a 1-3$^{rd}$ interference image X13, and a 1-4$^{th}$ interference image X14.

The image analysis unit 800 can acquire an amplitude matrix image A11 of the sample at the first angle and a phase matrix image A21 of the sample at the first angle by calculating the four interference images X11-X14 having different polarization states included in the interference image A1 at the first angle according to the Jones matrix method, given by (1):

$$\begin{pmatrix} J11 & J12 \\ J21 & J22 \end{pmatrix} = \begin{pmatrix} X11 + X21 & X22 - X12 \\ X11 - X21 & X12 + X22 \end{pmatrix} \quad (1)$$

The amplitude matrix image A11 at the first angle may include amplitude images X111-X114 in a 2×2 matrix. The amplitude matrix image A11 at the first angle may include a 1-1$^{st}$ amplitude image X111, a 1-2$^{nd}$ amplitude image X112, a 1-3$^{rd}$ amplitude image X113, and a 1-4$^{th}$ amplitude image X114.

The phase matrix image A21 at the first angle may include phase images in a 2×2 matrix. The phase matrix image A21 at the first angle may include a 1-1$^{st}$ phase image X211, a 1-2$^{nd}$ phase image X212, a 1-3$^{rd}$ phase image X213, and a 1-4$^{th}$ phase image X214.

For the interference images A2-A5 at the second to fifth angles, amplitude matrix images A12-A15 at the second to fifth angles and phase matrix images A22-A25 at the second to fifth angles can be acquired in the same manner as described above.

The image analysis unit 800 can acquire a synthesized amplitude matrix image and a synthesized phase matrix image by aperture synthesis of the matrix images at different angles. The synthesized amplitude matrix image may include multiple synthesized amplitude images and the synthesized phase matrix image may include multiple synthesized phase images.

Referring to FIGS. 7B and 8, the image analysis unit 800 can acquire a synthesized amplitude matrix image C1 by aperture synthesis of the amplitude matrix images A1l-A15 at different angles. The synthesized amplitude matrix image C1 may include multiple synthesized amplitude images. In an embodiment, the synthesized amplitude matrix image C1 may include synthesized amplitude images C11-C14 in a 2×2 matrix. That is, the synthesized amplitude matrix image C1 may include first to fourth synthesized amplitude images C11-C14.

The image analysis unit 800 can acquire a synthesized phase matrix image C2 by aperture synthesis of the phase matrix images A21-A25 at different angles. The synthesized phase matrix image C2 may include multiple synthesized phase images. In an embodiment, the synthesized phase matrix image C2 may include synthesized phase images in a 2×2 matrix. That is, the synthesized phase matrix image C2 may include first to fourth synthesized phase images C21-C24.

The image analysis unit 800 can acquire a birefringence image of the sample by matrix diagonalization of the synthesized amplitude matrix image C1 and the synthesized phase matrix image C2. In an embodiment, the image analysis unit 800 may acquire a birefringence image by matrix diagonalization because the synthesized amplitude images C11-C14 and the synthesized phase images C21-C24 are 2×2 matrices.

As can be seen from FIG. 10, as the number of synthesis of the matrix images taken at several angles increases, the contrast and signal-to-noise ratio (SNR) increase.

(a) of FIG. 11 is a birefringence image using single matrix images and (b) of FIG. 11 is a birefringence image using synthesized matrix images. The multiple images included in the single matrix image contain diffraction noise above a predetermined level. In contrast, a reduced level of diffraction noise is contained in the synthesized images included in the synthesized matrix images due to the effect of aperture synthesis, achieving improved resolution. For example, the aperture synthesis of the matrix images at different angles in the image analysis unit can reduce the level of diffraction noise, leading to an improvement in resolution. Thus, the polarization holographic microscope system 10 uses the synthesized matrix images acquired by aperture synthesis of the matrix images at different angles to acquire a high-resolution birefringence image. That is, the birefringence image acquired by the polarization holographic microscope system 10 is highly sensitive enough to image individual cells through an optical system.

Referring to FIGS. 7B and 12, the image analysis unit 800 can extract amplitude images X111, X121, X131, and X141 at different angles as diagonal matrix elements from each of the amplitude matrix images A11-A15 at different angles to acquire a group R1 of the amplitude images at different angles. The amplitude images X111, X121, X131, and X141 at different angles as diagonal matrix elements may be images obtained after the sample beam is linearly polarized at 0°, penetrates the sample, and is output by the 0° linear polarizing filter or images obtained after the sample beam is linearly polarized at 90°, penetrates the sample, and is output by the 90° linear polarizing filter. Thus, the amplitude images X111, X121, X131, and X141 at different angles as diagonal matrix elements may be images whose polarization states are not changed by the sample. The information about the intensity and phase of light obtained in the polarization holographic microscope system 10 may be the same as those obtained in general polarization holographic microscope systems.

The image analysis unit 800 can extract phase images X211, X221, X231, and X241 at different angles as diagonal matrix elements from each of the phase matrix images at different angles A21-A25 to acquire a group R2 of the phase images at different angles. Due to the limited page space, amplitude images from the amplitude matrix image at the fifth angle and phase images from the phase matrix image at the fifth angle are omitted from the group R1 of the amplitude images at different angles and the group R2 of the phase images at different angles, respectively.

As shown in FIG. 13, the image analysis unit 800 can use the group R1 of the amplitude images at different angles and the group R2 of the phase images at different angles to acquire 2D phase images taken at various angles. In addition, the image analysis unit 800 can use the 2D phase images to acquire a three-dimensional cross-sectional image and can acquire information about the volume of the sample by quantitative phase tomography reconstruction.

Specifically, the image analysis unit 800 can extract the 1-$1^{st}$ amplitude image from the first amplitude matrix image, the 2-$1^{st}$ amplitude image from the second amplitude matrix image, the 3-$1^{st}$ amplitude image from the third amplitude matrix image, the 4-$1^{st}$ amplitude image from the fourth amplitude matrix image, and the 5-$1^{st}$ amplitude image from the fifth amplitude matrix image. The image analysis unit 800 can acquire a group of the extracted amplitude images at different angles.

The image analysis unit 800 can extract phase images at different angles as diagonal matrix elements from each of the phase matrix images at different angles to acquire a group of the phase images at different angles. In an embodiment, the image analysis unit 800 may extract the 1-$1^{st}$ phase image from the first phase matrix image, the 2-$1^{st}$ phase image from the second phase matrix image, the 3-$1^{st}$ phase image from the third phase matrix image, the 4-$1^{st}$ phase image from the fourth phase matrix image, and the 5-$1^{st}$ phase image from the fifth phase matrix image. The image analysis unit 800 can acquire a group of the extracted phase images at different angles.

The image analysis unit 800 can use the group of the amplitude images at different angles and the group of the phase images at different angles to acquire a three-dimensional cross-sectional image. The image analysis unit 800 can use the group of the amplitude images at different angles and the group of the phase images at different angles to acquire 2D phase images (see FIG. 13) taken at various angles. The image analysis unit 800 can use the 2D phase images at different angles to acquire a three-dimensional cross-sectional image.

Hereinafter, a sample image acquisition method using the polarization holographic microscope system 10 is described with reference to FIGS. 1 to 13.

The light source unit 100 of the polarization holographic microscope system 10 can irradiate laser beams having different polarization directions onto the beam splitting unit 200.

The irradiated laser beams can be split into a sample beam and a reference beam by the beam splitting unit 200. The sample beam may include laser beams having different polarization directions.

The sample beam can enter the sample image forming unit 300. The galvano scanner 310 of the sample image forming unit 300 can control the angle of the sample beam such that the sample beam enters the sample at various angles. Images of the sample at different angles can be formed in the sample beam incident on the sample at various angles.

In an embodiment, the first path block 451 may determine areas for the images included in the sample beam having passed through the sample image forming unit 300. For example, the first path block 451 may determine the size of the images included in the sample beam. In an alternative embodiment, the need to determine image areas of the sample beam may be avoided.

The sample beam having passed through the sample image forming unit 300 can enter the multiple image forming unit 400. The multiple image forming unit 400 can diffract the incident sample beam to form multiple images in each of the images at different angles. For example, the sample beam entering the multiple image forming unit 400 may include multiple images at different angles. Each of the multiple images at different angles may include a single image. The single image can be reproduced when the sample beam is diffracted by the two-dimensional diffraction grating 420 of the multiple image forming unit 400, and as a result, multiple images can be formed in each of the images at different angles.

In an embodiment, the sample beam having passed through the multiple image forming unit 400 may pass through the second path block. In this embodiment, the area for each of the images at different angles can be changed by the second path block. For example, when nine multiple images are included in the area for each of the images at different angles, they may be reduced to four multiple images by the second path block. In an alternative embodiment, the need for the second path block may be eliminated.

The sample beam having passed through the multiple image forming unit 400 can enter the linear polarizing filter unit 600. The linear polarizing filter unit 600 can polarize the sample beam, where the multiple images formed, in each of the images at different angles. Thus, some of the multiple images can be polarized by the first polarizing filter 610 having a polarization axis of a first angle and some of the multiple images can be polarized by the second polarizing filter 620 having a polarization axis of a second angle.

The polarized sample beam can be combined with the reference beam from the beam splitting unit 200 in the interference image acquisition unit 700. The acquisition unit 700 can combine the polarized sample beam with the reference beam to acquire interference images at different angles. Each of the interference images at different angles may include multiple interference images having different polarization states. In an embodiment, each of the interference images at different angles may include interference images in an N×N matrix.

Here, the reference beam may be a combination of laser beams having different polarization directions. The laser beams having different polarization directions may not overlap with each other. For example, the first reference beam B21 may be located as the first laser beam in the −X axis and the second reference beam B22 may be located as the second laser beam in the +X axis. Thus, the reference beam may be a combination of the first reference beam B21 and the second reference beam B22.

The image analysis unit 800 can acquire matrix images of the sample at different angles by calculating the interference images at different angles using the Jones matrix method. In an embodiment, the matrix images at different angles may include multiple amplitude matrix images at different angles and multiple phase images at different angles. Each of the amplitude matrix images at different angles may include multiple amplitude images and each of the phase matrix images at different angles may include multiple phase images. In an embodiment, each of the amplitude matrix images at different angles may include four amplitude images in a 2×2 matrix and each of the phase matrix images at different angles may include four phase images in a 2×2 matrix.

The image analysis unit 800 can acquire a synthesized amplitude matrix image and a synthesized phase matrix image by aperture synthesis of the matrix images at different angles. The synthesized amplitude matrix images may include multiple synthesized amplitude images and the synthesized phase matrix image may include multiple synthesized phase images. In an embodiment, the synthesized amplitude matrix image may include four synthesized amplitude images in a 2×2 matrix and the synthesized phase matrix image may include four synthesized phase images in a 2×2 matrix.

The image analysis unit 800 can acquire a birefringence image of the sample by matrix diagonalization of the synthesized amplitude matrix image and the synthesized phase matrix image. The synthesized amplitude matrix image and the synthesized phase matrix image are obtained by synthesizing the images at various angles, enabling the acquisition of a high sensitivity birefringence image of the sample.

The image analysis unit 800 can extract amplitude images at different angles as diagonal matrix elements from each of the amplitude matrix images at different angles to acquire a group of the amplitude images at different angles. In addition, the image analysis unit 800 can extract phase images at different angles as diagonal matrix elements from each of the phase matrix images at different angles to acquire a group of the phase images at different angles.

The amplitude images at different angles may contain information whose polarization state is not changed by the sample. The phase images at different angles may contain information whose polarization state is not changed by the sample.

The image analysis unit 800 can use the group of the amplitude images at different angles and the group of the phase images at different angles to acquire a three-dimensional cross-sectional image.

Although the present invention has been described herein with reference to the specific embodiments, these embodiments do not serve to limit the invention and are set forth for illustrative purposes. It will be apparent to those skilled in the art that modifications and improvements can be made without departing from the spirit and scope of the invention.

Such simple modifications and improvements of the present invention belong to the scope of the present invention, and the specific scope of the present invention will be clearly defined by the appended claims.

What is claimed is:

1. A polarization holographic microscope system comprising:
   a light source unit irradiating laser beams having different polarization directions;
   a beam splitting unit splitting the laser beams from the light source unit into a sample beam and a reference beam;
   a sample image forming unit controlling the angle of the sample beam from the beam splitting unit and allowing the sample beam to enter a sample to form images of the sample at different angles in the sample beam;
   a multiple image forming unit diffracting the sample beam having passed through the sample image forming unit to form multiple images in each of the images at different angles;
   a linear polarizing filter unit polarizing the sample beam having passed through the multiple image forming unit; and
   an interference image acquisition unit combining the sample beam having passed through the linear polarizing filter unit with the reference beam to acquire interference images at different angles,
   wherein each of the interference images at different angles comprises multiple interference images having different polarization states,
   wherein the polarization holographic microscope system further comprises an image analysis unit acquiring a birefringence image and a three-dimensional cross-sectional image of the sample using the interference images at different angles acquired in the interference image acquisition unit, and wherein the image analysis unit calculates the interference images at different angles using the Jones matrix method to acquire matrix images of the sample at different angles, the matrix images at different angles comprise multiple amplitude matrix images at different angles and multiple phase matrix images at different angles, each of the amplitude matrix images at different angles comprises multiple amplitude images, and each of the phase matrix images at different angles comprises multiple phase images.

2. The polarization holographic microscope system according to claim 1, wherein the image analysis unit acquires a synthesized amplitude matrix image and a synthesized phase matrix image by aperture synthesis of the matrix images at different angles and a birefringence image of the sample by matrix diagonalization of the synthesized amplitude matrix image and the synthesized phase matrix image, the synthesized amplitude matrix image comprises multiple synthesized amplitude images, and the synthesized phase matrix image comprises multiple synthesized phase images.

3. The polarization holographic microscope system according to claim 2, wherein the image analysis unit performs aperture synthesis of the matrix images at different angles to reduce diffraction noise and achieve improved resolution.

4. The polarization holographic microscope system according to claim 1, wherein the image analysis unit extracts amplitude images at different angles as diagonal matrix elements from each of the amplitude matrix images at different angles to acquire a group of the amplitude images at different angles, extracts phase images at different angles as diagonal matrix elements from each of the phase matrix images at different angles to acquire a group of the phase images at different angles, and acquires a three-dimensional cross-sectional image using the group of the amplitude images at different angles and the group of the phase images at different angles.

5. The polarization holographic microscope system according to claim 1, wherein the sample image forming unit comprises a sample holder holding the sample and a galvano scanner controlling the angle of the sample beam entering the sample from the beam splitting unit.

6. The polarization holographic microscope system according to claim 1, wherein the linear polarizing filter unit comprises a first polarizing filter having a polarization axis of +45° and a second polarizing filter located in the Y-axis direction from the first polarizing filter and having a polarization axis of −45°, portions of the sample beam having passed through the multiple image forming unit are polarized by the first polarizing filter, and portions of the sample beam having passed through the multiple image forming unit are polarized by the second polarizing filter.

7. The polarization holographic microscope system according to claim 1, wherein the light source unit comprises a first laser source irradiating a first laser beam and a second laser source irradiating a second laser beam having a polarization direction orthogonal to the polarization direction of the first laser beam, the beam splitting unit comprises a first beam splitter splitting the first laser beam into a first sample beam and a first reference beam and a second beam splitter splitting the second laser beam into a second sample beam and a second reference beam, and the first sample beam from the first beam splitter overlaps the second sample beam from the second beam splitter.

8. The polarization holographic microscope system according to claim 1, wherein the multiple image forming unit comprises a two-dimensional diffraction grating diffracting the sample beam having passed through the sample image forming unit and reproducing a single image contained in each of the images at different angles to form the multiple images in each of the images at different angles.

9. The polarization holographic microscope system according to claim 8, wherein the multiple image forming unit further comprises a pair of lenses spaced apart from each other and the two-dimensional diffraction grating is placed on the Fourier plane, where the sample beam is focused, between the pair of lenses.

10. The polarization holographic microscope system according to claim 1, wherein the image analysis unit simultaneously acquires information about the birefringence image and the three-dimensional cross-sectional image.

11. A sample image acquisition method using the polarization holographic microscope system according to claim 1, the method comprising: allowing the light source unit to irradiate laser beams having different polarization directions; allowing the beam splitting unit to split the laser beams into a sample beam and a reference beam; controlling the angle of the sample beam such that the sample beam enters a target sample to form images of the sample at different angles therein; diffracting the sample beam to form multiple images in each of the images at different angles; polarizing the sample beam, where the multiple images are formed, in each of the images at different angles; and combining the polarized sample beam with the reference beam to acquire interference images at different angles, wherein each of the interference images at different angles comprises multiple interference images having different polarization states,
   wherein the polarization holographic microscope system further comprises an image analysis unit analyzing the interference images at different angles acquired in the interference image acquisition unit, and
   wherein the method further comprises allowing the image analysis unit to calculate the interference images at different angles using the Jones matrix method to acquire matrix images of the sample at different angles, the matrix images at different angles comprise multiple amplitude matrix images at different angles and multiple phase matrix images at different angles, each of the amplitude matrix images at different angles comprises multiple amplitude images, and each of the phase matrix images at different angles comprises multiple phase images.

12. The sample image acquisition method according to claim 11, further comprising acquiring a synthesized amplitude matrix image and a synthesized phase matrix image by aperture synthesis of the matrix images at different angles and acquiring a birefringence image of the sample by matrix diagonalization of the synthesized amplitude matrix image and the synthesized phase matrix image wherein the synthesized amplitude matrix image comprises multiple synthesized amplitude images and the synthesized phase matrix image comprises multiple synthesized phase images.

13. The sample image acquisition method according to claim 11, further comprising extracting amplitude images at different angles as diagonal matrix elements from each of the amplitude matrix images at different angles to acquire a group of the amplitude images at different angles, extracting phase images at different angles as diagonal matrix elements from each of the phase matrix images at different angles to acquire a group of the phase images at different angles, and acquiring a three-dimensional cross-sectional image using the group of the amplitude images at different angles and the group of the phase images at different angles.

* * * * *